United States Patent [19] [11] 4,031,011
Dorgathen [45] June 21, 1977

[54] MAGNETIC FILTER APPARATUS

[75] Inventor: Friedrich Dorgathen, Hosel, Germany

[73] Assignee: Montanus Industrieanlagen GmbH, Essen, Germany

[22] Filed: June 19, 1975

[21] Appl. No.: 588,404

[30] Foreign Application Priority Data

June 21, 1974 Germany .......................... 2429849

[52] U.S. Cl. .............................. 210/222; 210/396; 210/400; 210/526
[51] Int. Cl.² ........................................ B01D 35/06
[58] Field of Search .......... 210/222, 223, 106, 107, 210/400, 251, 526, 396, 161; 209/218, 228, 229, 230

[56] References Cited
UNITED STATES PATENTS

| 1,188,340 | 6/1916 | Tark | 210/161 |
| 2,471,044 | 5/1949 | Scrivener | 210/222 |
| 2,759,606 | 8/1956 | Nippert | 210/222 |
| 2,822,089 | 2/1958 | Woodruff | 210/222 X |
| 3,357,559 | 12/1967 | Israelson | 210/223 X |
| 3,537,586 | 11/1970 | Huntteler | 210/222 |
| 3,712,472 | 1/1973 | Elliott | 210/222 |
| 3,848,743 | 11/1974 | Danberg | 209/218 |

Primary Examiner—Theodore A. Granger
Attorney, Agent, or Firm—John J. Dennemeyer

[57] ABSTRACT

Magnetic filter apparatus comprising a liquid container with an inlet for liquid contaminated by magnetizable material and an outlet for purified liquid. A wall of magnetic bars is disposed between the inlet and the outlet and liquid can flow through gaps between the bars. The wall of magnetic bars is carried by an endless conveyor which conveys the bars through a cleaning device located above the level of the liquid outlet in the container. The cleaning device comprises travelling wiper blades which engage the magnetic bars from opposite sides and pass lengthwise along the bars to remove magnetizable material which has adhered thereto.

8 Claims, 5 Drawing Figures

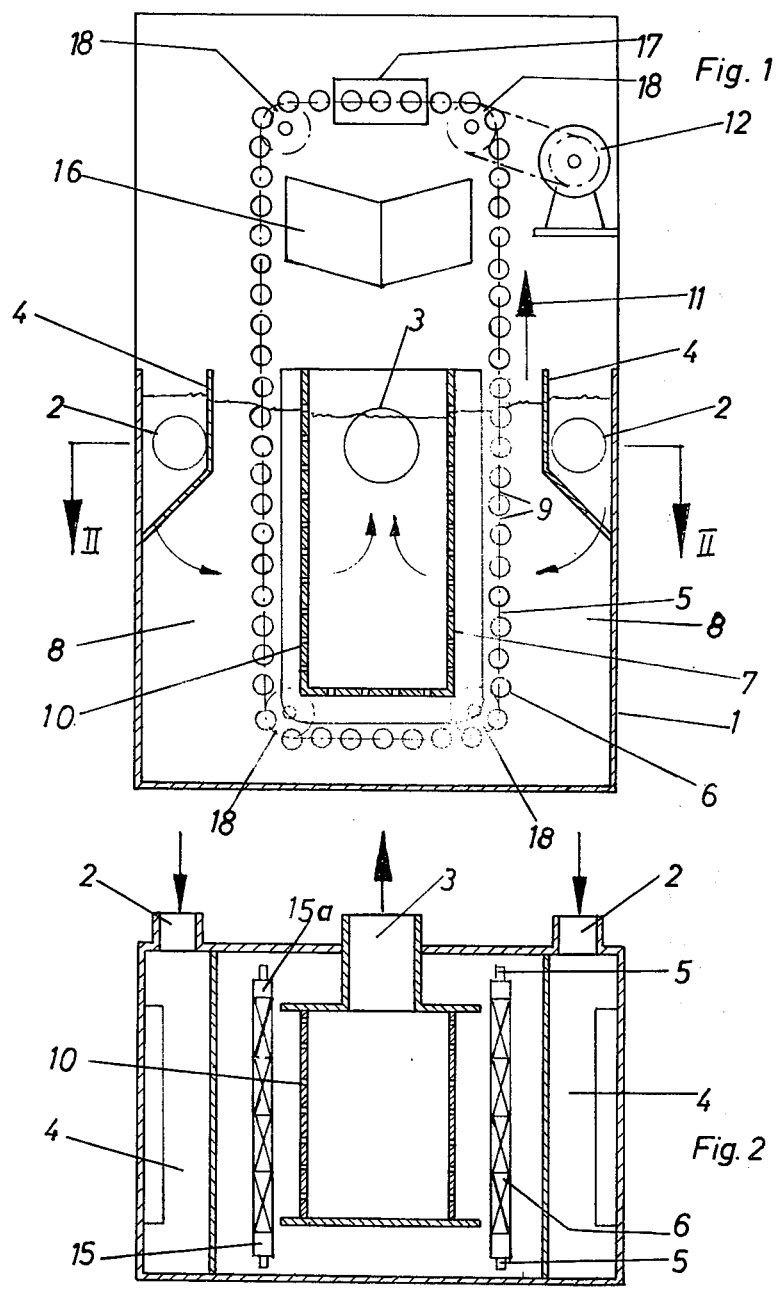

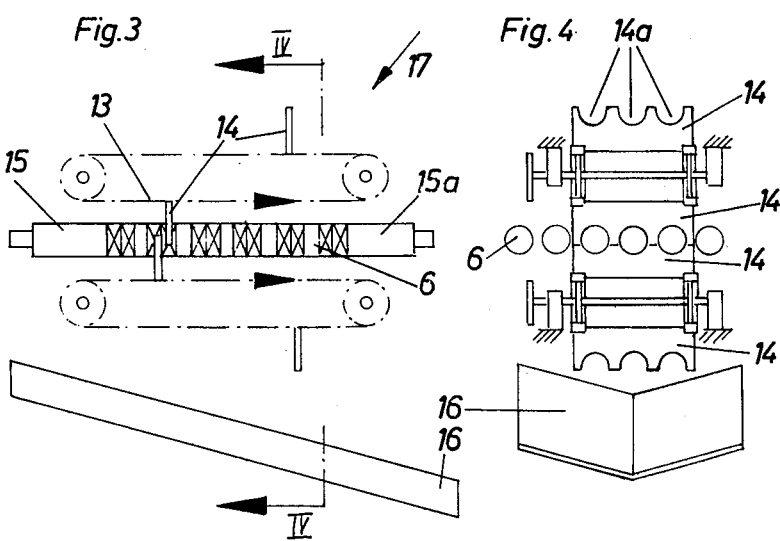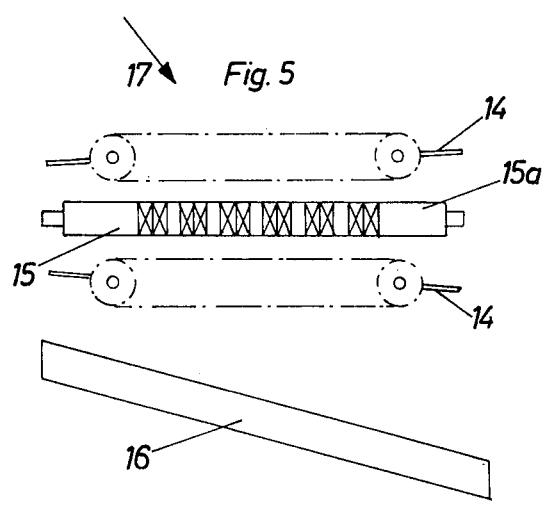

MAGNETIC FILTER APPARATUS

This invention relates to a magnetic filter apparatus.

According to the present invention there is provided magnetic filter apparatus comprising a liquid container, an inlet for liquid contaminated by magnetisable material, an outlet for purified liquid, a wall of magnetic bars disposed between said inlet and said outlet and having gaps therebetween for the passage of liquid, an endless conveyor carrying said wall of magnetic bars, drive means for driving said conveyor, and a cleaning device for cleaning said magnetic bars above the level of said liquid outlet.

The invention will now be further described by way of example only with reference to the accompanying drawings, in which:

FIG. 1 is a diagram of one embodiment of magnetic filter apparatus according to the invention.

FIG. 2 is a section on line II—II of FIG. 1;

FIG. 3 is a side view to an enlarged scale of a cleaning device forming part of the apparatus shown in FIG. 1;

FIG. 4 is a section on line IV—IV of FIG. 3, and

FIG. 5 is a side view corresponding to FIG. 3 but showing the cleaning device in the inoperative position.

Referring to FIG. 1 of the drawings, the exemplary apparatus comprises a container 1 having at opposite sides thereof liquid inlets 2 through which liquid flows into respective distributors 4. Suspended in the container 1 is a collecting vessel 7 with an outlet 3. The floor and a pair of opposed side walls of the collecting vessel 7 have holes 10 therein. As best seen in FIG. 2 the perforated side walls are interconnected by a further pair of side walls which extend outwardly beyond the perforated side walls into the vicinity of magnetic bars 6.

The magnetic bars 6 are carried by and extend between two endless conveyor chains 5 which are guided by rollers 18 in a generally rectangular path around the vessel 7. The bars 6 are mutually parallel and have gaps 9 therebetween. One of the rollers 18 is connected to a drive 12.

The top run of magnetic bars 6 passes through a cleaning device 17 below which is located a discharge chute 16. The cleaning device 17 comprises top and bottom endless chains 13 defining therebetween a gap in which is disposed at any one time a plurality of magnetic bars 6. The chains 13 extend lengthwise of the bars 6 and carry wipers or scrapers 14. A pair of scrapers 14 is provided on each chain 13 180° out of phase with each other. Each scraper 14 is of generally rectangular shape with semi-circular recesses 14a formed along its edge remote from the respective chain 13.

The method of operation of the magnetic filter apparatus according to the invention is as follows:

Liquid contaminated with magnetisable material passes through the inlets 2 into the distributors 4 and from there into the contaminated section 8 of the liquid container 1 which is under atmospheric pressure. From there, the liquid flows at low speed through the gaps 9 between the magnetic bars 6 attached to the endless conveyor chains 5 and reaches the collecting vessel 7, ferritic impurities located in the dirty liquid being deposited on the magnetic bars 6. The holes 10 in the collecting vessel 7 ensure a uniform flow between the magnetic bars 6. The clarified liquid leaves the collecting vessel 7 through the outlet 3.

The magnetic bars 6 travelling around the collecting vessel 7 are gradually coated by the particles of magnetisable material and then pass to the cleaning device 17 for cleaning. The drive 12 thus advances the conveying chains 5, which are guided around the collecting vessel 7 by guide rollers 18, stepwise by one magnetic bar in the direction of arrow 11. Liquid drains from the magnetic bars until they reach the cleaning device 17.

In the cleaning device 17, the chains 13 rotate above and below the magnetic bars 6 and the scrapers 14 thus scrape the magnetisable material along each magnetic bar 6 to a non-magnetic part 15a from which the material drops into the discharge chute 16 provided therefore, for the purpose of being removed. The device 16 consists of an inclined plate metal chute or a conveyor belt. Since the dirt scrapers 14 circulating on chains arrive on a circular path before the rectilinear scraping movement, at the inlet side, the magnetic bars 6 are provided with further non-magnetic ends 15 to which magnetisable material cannot adhere and which are not wiped by the circulating dirt scrapers at the beginning of the wiping operation. The semi-circular recesses 14a of the scrapers 14 encompass half the magnetic bars 6 and two opposing scrapers 14 located opposite each other fully encompass the magnetic bars 6 (FIG. 4). When the scrapers have completed their wiping operation, they remain in a position outside the magnetic bars (as shown in FIG. 5) until a further dirty magnetic bar has arrived in the cleaning device. A new cleaning cycle may thus take place as afore-described.

It is also conceivable to construct the magnetic filter system such that in place of the endless conveyor belts, two cylindrical discs are provided which have a large number of bores on the outer periphery of the discs. When a plurality of magnetic bars is inserted in these bores, a rigid and secure connection to the two discs is achieved. A magnetic drum is thus formed in which the surface of the drum is covered by a magnetic field, which is caused by the magnetic bars distributed on the periphery and arranged with gaps for the flow of the purified liquid. In this case also the dirty bars are advanced stepwise by one magnetic bar to a cleaning device located above the liquid. In a construction of the magnetic filter system of this type, the dirt scrapers are not brought into operation by rotating chains, but actuated in the manner of a cylinder and wipe in a straight line over the magnetic bar and back.

I claim:

1. A magnetic filter apparatus for removing magnetisable material from a liquid contaminated therewith, comprising:

a. a container for receiving contaminated liquid;

b. a plurality of magnetic bars operatively engaged with support means for securing said bars in spaced, substantially mutually parallel relationship, thereby defining a plurality of gaps between successive bars;

c. drive means for moving said support means and said magnetic bars;

d. guide means defining a path for said support means and said magnetic bars, said path extending at least partially within the liquid in said container and partially above the liquid in said container;

e. cleaning means, disposed substantially vertically above the surface of the liquid in said container and at a position contiguous with said path for said support means, for operative engagement with said magnetic bars for removing magnetisable material therefrom; and, f. discharge means disposed vertically intermediate said cleaning means and the surface of the liquid in said container for receiving magnetisable material removed from said bars by said cleaning means;

wherein said cleaning means comprises a plurality of wiper blades, with recesses of complementary geometrical configuration with respect to the geometrical shape of the magnetic bars, arranged to extend substantially around the periphery of at least one of said magnetic bars, and means for moving said wiper blades across the surfaces of said magnetic bars.

2. The apparatus of claim 1, wherein said means for moving said wiper blades consists of a pair of endless conveyor belts upon which said wiper blades are secured, said belts disposed on opposite sides of the path for said support means and substantially vertically above said discharge means.

3. The apparatus of claim 1, wherein each of said magnetic bars is substantially cylindrical and wherein each of said wiper blades has a plurality of semicircular recesses for engaging the surfaces of a plurality of adjacent bars.

4. The apparatus of claim 1, wherein the path of said support means and said magnetic bars has a horizontal dimension less than the horizontal dimension of said container, whereby liquid carried from said container during motion of said support means and said magnetic bars may drain into said container.

5. The apparatus of claim 1, wherein said support means for said magnetic bars is an endless conveyor and wherein said guide means are a plurality of pulleys about which said conveyor is disposed.

6. The apparatus of claim 1, wherein each of said magnetic bars is formed with a terminal non-magnetic portion.

7. A magnetic filter apparatus for removing magnetisable material from a liquid contaminated therewith, comprising:

a. a container for receiving contaminated liquid;

b. a plurality of magnetic bars operatively engaged with support means for securing said bars in spaced, substantially mutually parallel relationship, thereby defining a plurality of gaps between successive bars;

c. drive means for moving said support means and said magnetic bars;

d. guide means defining a path for said support means and said magnetic bars, said path extending at least partially within the liquid in said container and partially above the liquid in said container;

e. cleaning means, disposed substantially vertically above the surface of the liquid in said container and at a position contiguous with said path for said support means, for operative engagement with said magnetic bars for removing magnetisable material therefrom; and, f. discharge means disposed vertically intermediate said cleaning means and the surface of the liquid in said container for receiving magnetisable material removed from said bars by said cleaning means;

wherein said container comprises at least one liquid inlet and a centrally disposed, suspended collection vessel having perforated side and bottom walls, and wherein the portion of said path of said support means and said magnetic bars within the liquid is substantially contiguous with the side and bottom walls of said collection vessel and intermediate the walls of said container and said collection vessel, the interior of said collection vessel communicating with liquid outlet means; whereby liquid to be cleaned is introduced through said inlet, passes through the gaps between successive magnetic bars which capture magnetisable contaminants, through said perforations in the collection vessel to the interior thereof, and is discharged through said outlet means.

8. The apparatus of claim 7, wherein the path of said support means and said magnetic bars has a horizontal dimension less than the horizontal dimension of said container, whereby liquid carried from said container during motion of said support means and said magnetic bars may drain into said container.

* * * * *